(12) United States Patent
Chiba

(10) Patent No.: US 11,016,284 B2
(45) Date of Patent: May 25, 2021

(54) DISPLAY APPARATUS

(71) Applicant: SONY CORPORATION, Tokyo (JP)

(72) Inventor: Atsuhiro Chiba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 16/339,190

(22) PCT Filed: Jul. 24, 2017

(86) PCT No.: PCT/JP2017/026696
§ 371 (c)(1),
(2) Date: Apr. 3, 2019

(87) PCT Pub. No.: WO2018/078977
PCT Pub. Date: May 3, 2018

(65) Prior Publication Data
US 2019/0243125 A1 Aug. 8, 2019

(30) Foreign Application Priority Data

Oct. 27, 2016 (JP) .............................. JP2016-210930

(51) Int. Cl.
*G02B 26/04* (2006.01)
*G09G 3/34* (2006.01)
*G09G 3/20* (2006.01)

(52) U.S. Cl.
CPC .............. *G02B 26/04* (2013.01); *G09G 3/20* (2013.01); *G09G 3/34* (2013.01); *G09G 3/3406* (2013.01)

(58) Field of Classification Search
CPC . G02B 26/04; G09G 3/20; G09G 3/34; G09G 3/3406

(Continued)

(56) References Cited

U.S. PATENT DOCUMENTS 10,157,563 B2 * 12/2018 Cok ..................... H05B 45/00
10,388,205 B2 * 8/2019 Cok ......................... G09G 3/32
(Continued)

FOREIGN PATENT DOCUMENTS

CN     1559063 A    12/2004
CN     1776799 A    5/2006
(Continued)

OTHER PUBLICATIONS

International Search Report and Written Opinion of PCT Application No. PCT/JP2017/026696, dated Oct. 17, 2017, 09 pages of ISRWO.

(Continued)

*Primary Examiner* — William R Alexander
(74) *Attorney, Agent, or Firm* — Chip Law Group

(57) ABSTRACT

Setting of an order of sub-frame periods is simplified. A display element array section includes a plurality of arranged display elements in which a gray-scale display is performed in accordance with display data in each frame period that is a display period of one screen. A display control section divides the frame period into a plurality of sub-frame periods and divides the plurality of display elements into a plurality of groups to perform control of a display in each of the plurality of sub-frame periods in each of the plurality of groups. A display data supply section supplies the display data in each of the sub-frame periods to the display element array section by shifting a predetermined delay time in each of the groups and supplies the display data in each of the sub-frame periods to the display element array section on the basis of an order of the sub-frame periods in accordance with the number of the divided groups and the predetermined delay time.

5 Claims, 14 Drawing Sheets

(58) Field of Classification Search
USPC ......................................................... 359/296
See application file for complete search history.

(56) References Cited

U.S. PATENT DOCUMENTS

| | | | |
|---|---|---|---|
| 2005/0057454 | A1 | 3/2005 | Jang |
| 2006/0139378 | A1 | 6/2006 | Hon et al. |
| 2006/0284814 | A1 | 12/2006 | Ng |
| 2006/0284900 | A1 | 12/2006 | Ng |
| 2006/0284901 | A1 | 12/2006 | Ng |
| 2006/0284902 | A1 | 12/2006 | Ng |
| 2006/0284903 | A1 | 12/2006 | Ng |
| 2006/0284904 | A1 | 12/2006 | Ng |
| 2008/0259019 | A1 | 10/2008 | Ng |
| 2009/0002295 | A1 | 1/2009 | Hosaka |
| 2017/0206820 | A1* | 7/2017 | Cok .......................... G09G 3/32 |
| 2018/0342191 | A1* | 11/2018 | Cok ........................ G09G 3/2003 |

FOREIGN PATENT DOCUMENTS

| | | |
|---|---|---|
| CN | 101334979 A | 12/2008 |
| EP | 1655714 A2 | 5/2006 |
| JP | 2000-510252 A | 8/2000 |
| JP | 2002-351431 A | 12/2002 |
| JP | 2006-139278 A | 6/2006 |
| JP | 2009-008879 A | 1/2009 |
| KR | 2003-0032530 A | 4/2003 |
| WO | 03/041042 A1 | 5/2003 |
| WO | 2003/041042 A1 | 5/2003 |
| WO | 2006/138028 A2 | 12/2006 |

OTHER PUBLICATIONS

Office Action for JP Patent Application No. 2018-547128 dated Jan. 26, 2021, 04 pages of Office Action and 04 pages of English Translation.

* cited by examiner

F I G. 3
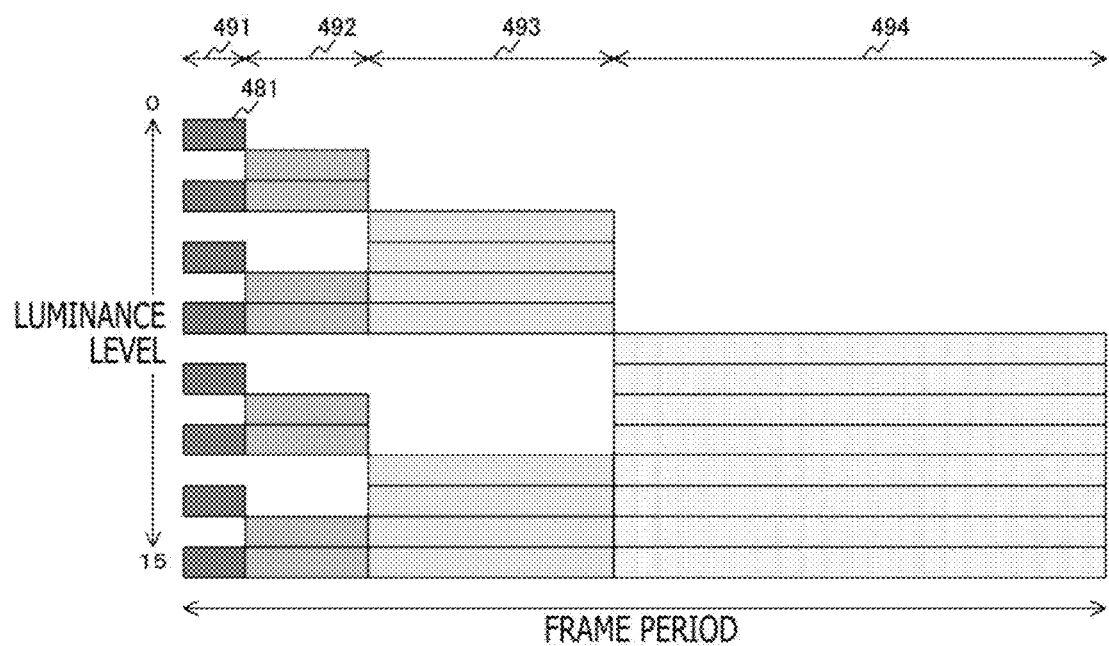

DISPLAY APPARATUS

CROSS REFERENCE TO RELATED APPLICATIONS

This application is a U.S. National Phase of International Patent Application No. PCT/JP2017/026696 filed on Jul. 24, 2017, which claims priority benefit of Japanese Patent Application No. JP 2016-210930 filed in the Japan Patent Office on Oct. 27, 2016. Each of the above-referenced applications is hereby incorporated herein by reference in its entirety.

TECHNICAL FIELD

The present technology relates to a display apparatus. More particularly, the present technology relates to a display apparatus that performs a gray-scale display.

BACKGROUND ART

In the related technique, a display apparatus using a display element that is in either state of display and non-display, for example, a display apparatus by a DMD (Digital Micromirror Device) in which display elements each having mobile fine mirror surfaces are arranged in a matrix form has been used. In the above display apparatus, a gray-scale display can be performed through PWM (Pulse Width Modulation). For example, there is used a display apparatus that divides a frame period that is a display period of one screen into a plurality of sub-frame periods in which respective periods are different and performs control of display and non-display in each of the sub-frame periods to thereby perform PWM. Here, the control of display and non-display of the sub-frame period is performed by using the display data that is generated in each sub-frame period in accordance with concentration of an image to be displayed.

The display data is transferred to each display element of the display apparatus before starting respective sub-frame periods. Therefore, in one frame period, it is necessary to perform a transfer of the display data of the number of times in accordance with the number of the sub-frame periods. In a display apparatus having high resolution and a high frame rate, there is a problem that shortage of a band of a signal line is caused when transferring the display data. To solve the problem, the display apparatus is divided into a plurality of areas, and a display order of the sub-frame periods is changed in respective areas to transfer the display data. Through the process, a display apparatus that performs the transfer of the display data in a distributed manner has been used. For example, there is proposed a display apparatus that changes a display order of sub-frame periods in each line of the display apparatus and performs the transfer of the display data (see, for example, PTL 1).

CITATION LIST

Patent Literature

[PTL 1]
JP-T-2000-510252

SUMMARY

Technical Problem

In the above-mentioned related technique, a display order of sub-frame periods is previously set in each line and a transfer of display data is performed. In the display order of the sub-frame period, it is necessary to rearrange and set the sub-frame periods in an order in which the transfer of the display data in each line is not overlapped with each other. Therefore, there is a problem that setting of the order becomes complicated.

The present technology has been made in view of such circumstances and it is an object of the present technology to simplify setting of an order of sub-frame periods and make a transfer of display data easy.

Solution to Problem

The present technology has been made to eliminate the above-mentioned disadvantages and a first aspect thereof is a display apparatus including a display element array section including a plurality of arranged display elements in which a gray-scale display is performed in accordance with display data in each frame period that is a display period of one screen, a display control section configured to divide the frame period into a plurality of sub-frame periods and divide the plurality of display elements into a plurality of groups to perform control of a display in each of the plurality of sub-frame periods in each of the plurality of groups, and a display data supply section configured to supply the display data in each of the sub-frame periods to the display element array section by shifting a predetermined delay time in each of the groups and supply the display data in each of the sub-frame periods to the display element array section on a basis of an order of the sub-frame periods in accordance with the number of the divided groups and the predetermined delay time. This configuration has effectiveness in that an order of the sub-frame periods to which the display data is provided is determined in accordance with the number of groups and the predetermined delay time.

In addition, in this first aspect, the display data supply section may supply the display data to the display element array section on a basis of the order of the sub-frame periods in which a total of the plurality of adjacent sub-frame periods is longer, by the delay time or more, than a product of the number of the sub-frame periods excluding a first one of the plurality of adjacent sub-frame periods, the number of groups, and the delay time in the plurality of adjacent sub-frame periods. This configuration has effectiveness in that a total of the plurality of adjacent sub-frame periods is longer, by the delay time or more, than a product of the number of the sub-frame periods excluding a first one of the plurality of adjacent sub-frame periods, the number of groups, and the delay time.

In addition, in this first aspect, the display data supply section may supply the display data to the display element array section on a basis of the order of the sub-frame periods in which a total of two adjacent sub-frame periods satisfies a conditional expression (a) below, and a total of three adjacent sub-frame periods satisfies a conditional expression (b) below.

$$T \times (G+1) \leq SF \quad \text{Conditional expression (a):}$$

$$T \times (2 \times G+1) \leq SF \quad \text{Conditional expression (b):}$$

in which,
SF: total of adjacent sub-frame periods
T: predetermined delay time
G: number of divided groups This configuration has effectiveness in that a total of a plurality of adjacent sub-frame periods is longer, by the delay time or more, than a product of the number of the sub-frame periods excluding a first one of the two and three adjacent sub-frame periods, the number of groups, and the delay time.

In addition, in this first aspect, the display data supply section may supply the display data to the display element array section by using, as the predetermined delay time, approximately the same period as a sub-frame period in which a period is shortest among the sub-frame periods. This configuration has effectiveness in that the sub-frame period in which a period is shortest and the predetermined delay time are approximately the same.

In addition, in this first aspect, the display control section may perform control of a display in each of the groups by shifting the predetermined delay time. This configuration has effectiveness in that a supply of the display data and the control of the display in each of the groups are performed by shifting the predetermined delay time.

In addition, in this first aspect, the display control section may output an updating signal for reflecting the supplied display data on the display of the plurality of display elements and thereby perform the control of the display. This configuration has effectiveness in that an output of the updating signal permits the control of the display to be performed.

In addition, in this first aspect, the display control section may further divide at least one of the plurality of sub-frame periods into a plurality of new sub-frame periods and distribute the plurality of new sub-frame periods to the frame period to perform the control of the display, and the display data supply section may further supply the display data in each of the plurality of new sub-frame periods to the display element array section. This configuration has effectiveness in that the divided sub-frame periods are distributed and arranged in the frame period.

Advantageous Effect of Invention

According to the present technology, it is possible to exert an excellent effect in that setting of an order of sub-frame periods is simplified and a transfer of display data is easily performed. Note that the effect described here is not necessarily limitative and may be any effect described in the present disclosure.

BRIEF DESCRIPTION OF DRAWINGS

FIG. 3 is a diagram illustrating an example of a gray-scale display of the display element 310 according to the embodiment of the present technology.

DESCRIPTION OF EMBODIMENTS

Hereinafter, modes (hereinafter, referred to as embodiments) for carrying out the present technology will be described. The description will proceed in the following order.

1. First embodiment (example of dividing a frame period into sub-frame periods)
2. Second embodiment (example of further dividing a sub-frame period)

1. First Embodiment

Configuration of Display Apparatus

Figure 1:
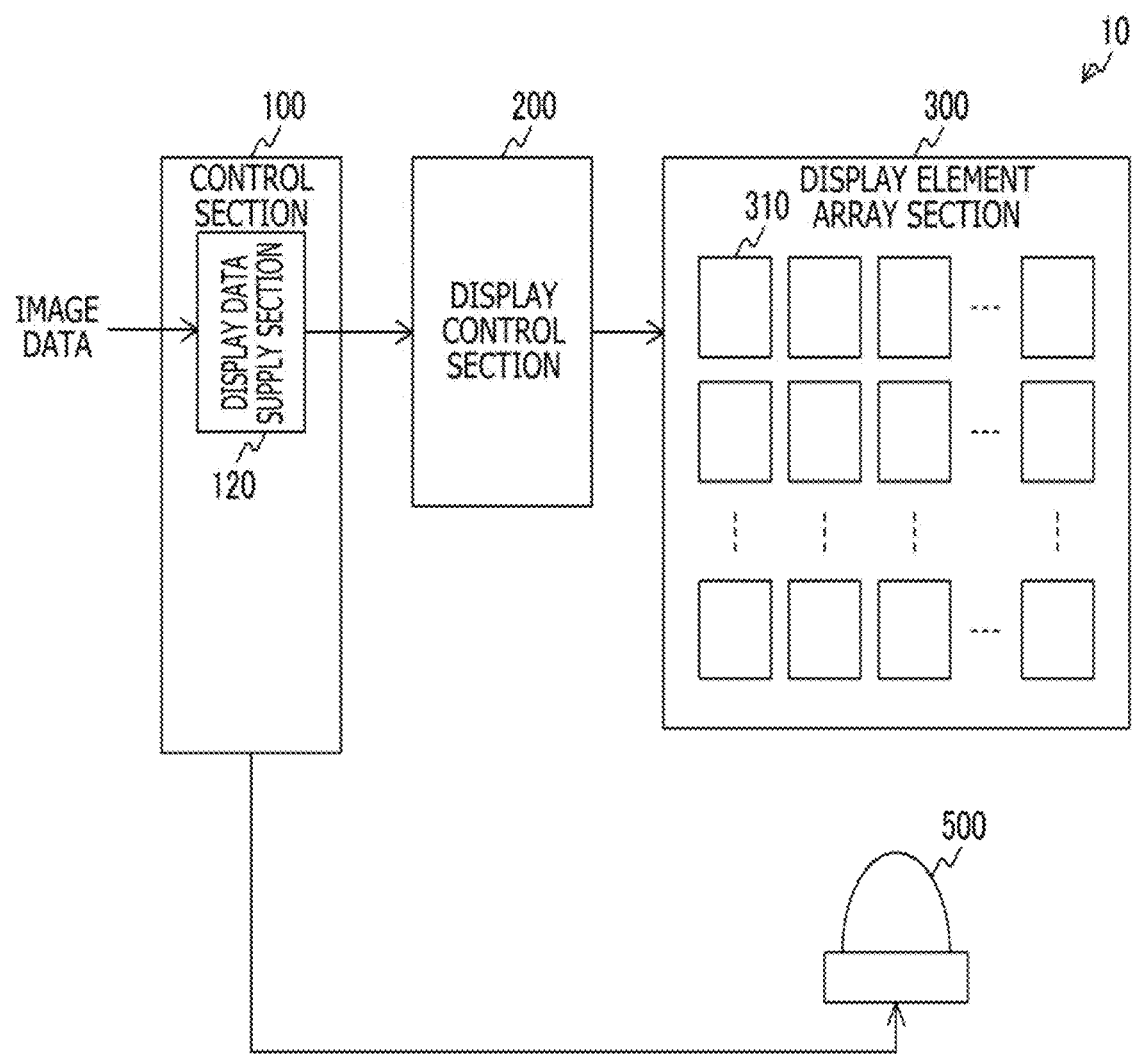
FIG. 1 is a diagram illustrating a configuration example of a display apparatus 10 according to an embodiment of the present technology.

FIG. 1 is a diagram illustrating a configuration example of a display apparatus 10 according to an embodiment of the present technology. The display apparatus 10 includes a display element array section 300, a display control section 200, a control section 100, and a light source 500.

The display element array section 300 is configured by display elements 310 being arranged in a matrix form. Here, the display element 310 corresponds to one pixel in a screen and performs a display in accordance with display data. Further, the display element 310 performs display in accordance with the display data in each frame period that is a display period of one screen. The display element array section 300 includes a display data holding section (not illustrated) that holds the display data for one line. Further, the display element array section 300 holds the display data output via the after-mentioned display control section 200 in the display data holding section. Further, the held display data is transferred to the display element 310 in each line. A shift register can be used as the display data holding section. Further, the display elements 310 arranged in the display element array section 300 are divided into a plurality of groups, and control of a display is performed in each group. Further, as described below, a frame period is divided into a plurality of sub-frame periods. In the display element 310, the control of the display is performed in each of the sub-frame periods. In the figure, the display element array section 300 by a DMD is assumed. Note that a PDP (Plasma Display Panel) or an FLC (Ferroelectric Liquid Crystal) can be used as the display element array section 300. Details of a configuration of the display element 310 will be described below.

The display control section 200 controls the display of the display elements 310 arranged in the display element array section 300. The display control section 200 performs control of the display element 310 in each group and in each sub-frame period. Further, the display control section 200 performs a transfer of the display data output in each group from the after-mentioned control section 100. Note that the display control section 200 can be formed into the same chip as that of the display element array section 300. Details of a configuration of the display control section 200 will be described below.

The control section 100 controls the entire display apparatus 10. The control section 100 converts the input image data into the display data of the display element 310 and supplies the display data to the display element 310 in each group and in each sub-frame period. The supply of the display data is performed by a display data supply section 120 illustrated in the figure. Further, the control section 100 further performs control of the light source 500. Details of a configuration of the control section 100 will be described below.

The light source 500 supplies irradiating light to the display element array section 300. For example, a xenon lamp, an LED (Light Emitting Diode), or an LD (Laser Diode) can be used as the light source 500. Note that when a xenon lamp is used as the light source 500, a color separation optical system such as a color wheel is used together to thereby perform a color display.

Configuration of Display Element

Figure 2:
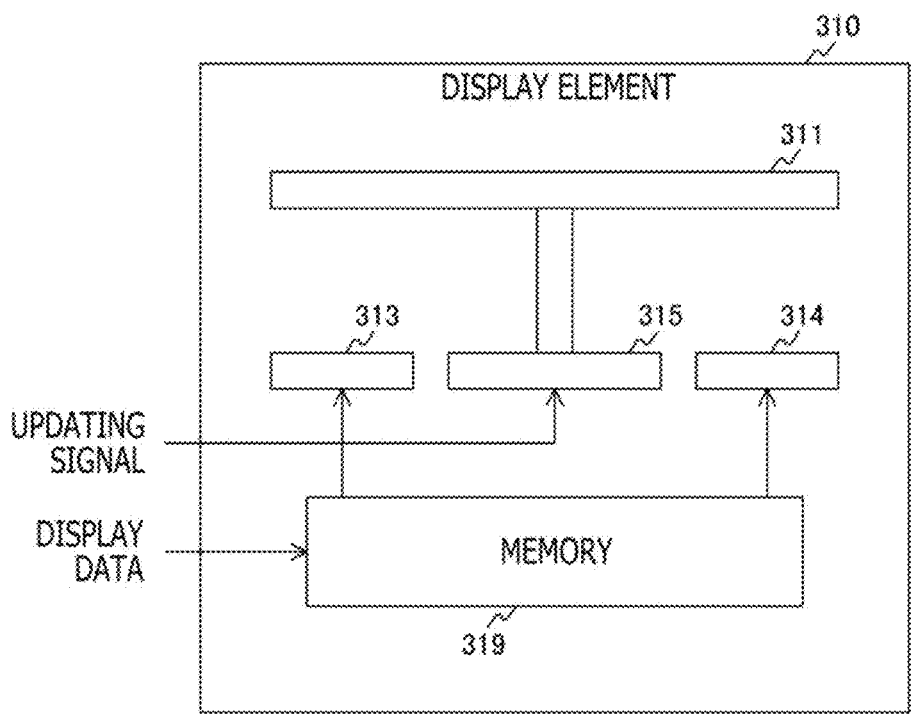
FIG. 2 is a diagram illustrating a configuration example of a display element 310 according to the embodiment of the present technology.

FIG. 2 is a diagram illustrating a configuration example of the display element 310 according to the embodiment of the present technology. The display element 310 includes a mirror 311, electrodes 313 and 314, a supporting part 315, and a memory 319.

The mirror 311 reflects light from the light source 500. The mirror 311 is coupled with the supporting part 315 via a support pillar. An inclination of the mirror 311 is changed to thereby change a reflection direction of light.

The supporting part 315 supports the mirror 311, etc. Further, a bias voltage for holding a state in which the mirror 311 is inclined and an update voltage for inverting the inclination of the mirror 311 are applied to the supporting part 315. The bias voltage and the update voltage are transferred to the mirror 311. The bias voltage and the update voltage are input to the supporting part 315 as an updating signal.

The electrodes 313 and 314 are electrodes for controlling an inclination direction of the mirror 311. An electric field is formed between the mirror 311 and the electrodes 313 and 314 due to a voltage applied to the electrodes 313 and 314. The mirror 311 is drawn to either of the electrodes 313 and 314 in accordance with the electric field and thereby the mirror 311 is allowed to be inclined.

The memory 319 is a memory that holds the display data input to the display element 310. The memory 319 applies an on signal in accordance with the held display data to either of the electrodes 313 and 314. When an on signal is applied to the electrode 313 and an update voltage is applied to the supporting part 315, the mirror 311 is held in a state of being inclined to the left side of the figure. Then, when the bias voltage is applied to the supporting part 315, the mirror 311 is held in a state of being inclined to the left side. In the state in which the bias voltage is applied to the supporting part 315, even in a case where an on signal is applied to the electrode 314, an inclination state of the mirror 311 is not changed. However, when the update voltage is applied to the supporting part 315, the mirror 311 is changed into a state of being inclined to the right side of the figure. As described above, in accordance with a state of an on signal in the electrodes 313 and 314 at the time when the update voltage is applied to the supporting part 315, the inclination direction of the mirror 311 can be set. Then, the bias voltage is applied to the supporting part 315 in place of the update voltage, and thereby the inclination direction of the mirror 311 can be held. The update voltage is applied as described above, and thereby the display data held in the memory 319 can be reflected on a display of the display element 310. Note that the update voltage is an example of the updating signal described in the scope of claims.

Light from the light source 500 is irradiated on the display element 310 and thereby reflection light can be obtained in accordance with the inclination of the mirror 311. For example, in a case in which the mirror 311 is inclined to the left side of the figure, reflection light is guided by a projection lens (not illustrated in FIG. 1) to thereby provide an image on a screen, etc. In this case, a state in which the mirror 311 is inclined to the left side of the figure is held as a display state and a state in which the mirror 311 is inclined to the right side of the figure is held as a state of non-display.

Gray-scale Display of Display Element

FIG. 3 is a diagram illustrating an example of a gray-scale display of the display element 310 according to the embodiment of the present technology. As illustrated in FIG. 2, the display element 310 is an element having two state of display and non-display. Since the gray-scale display is performed in the above display element 310, PWM is performed. The figure illustrates an appearance of the gray-scale display through PWM. Further, in the figure, a case in which 16 gray-scales display are performed is assumed. As illustrated in the figure, the frame period is divided into sub-frame periods 491 to 494 and the display and non-display of the display element 310 are switched in each of the sub-frame periods. Through the process, a length of a period at which a display is performed in one frame can be changed and the gray-scale display can be performed. In the figure, a hatched area 481 indicates the display period. Further, lengths of the sub-frame periods 491 to 494 are weighted. Specifically, the lengths of the sub-frame periods 492, 493, and 494 are weighted to a twofold, fourfold, and eightfold lengths of the sub-frame period 491, respectively. The weighting is performed as described above, and thereby a change in a luminance level can be performed in many stages. Note that the division of the frame period is not limited to an example illustrated in the figure and further can be performed in accordance with the number of divisions for performing a desired gray-scale display.

Configuration of Display Element Array Section

Figure 4:
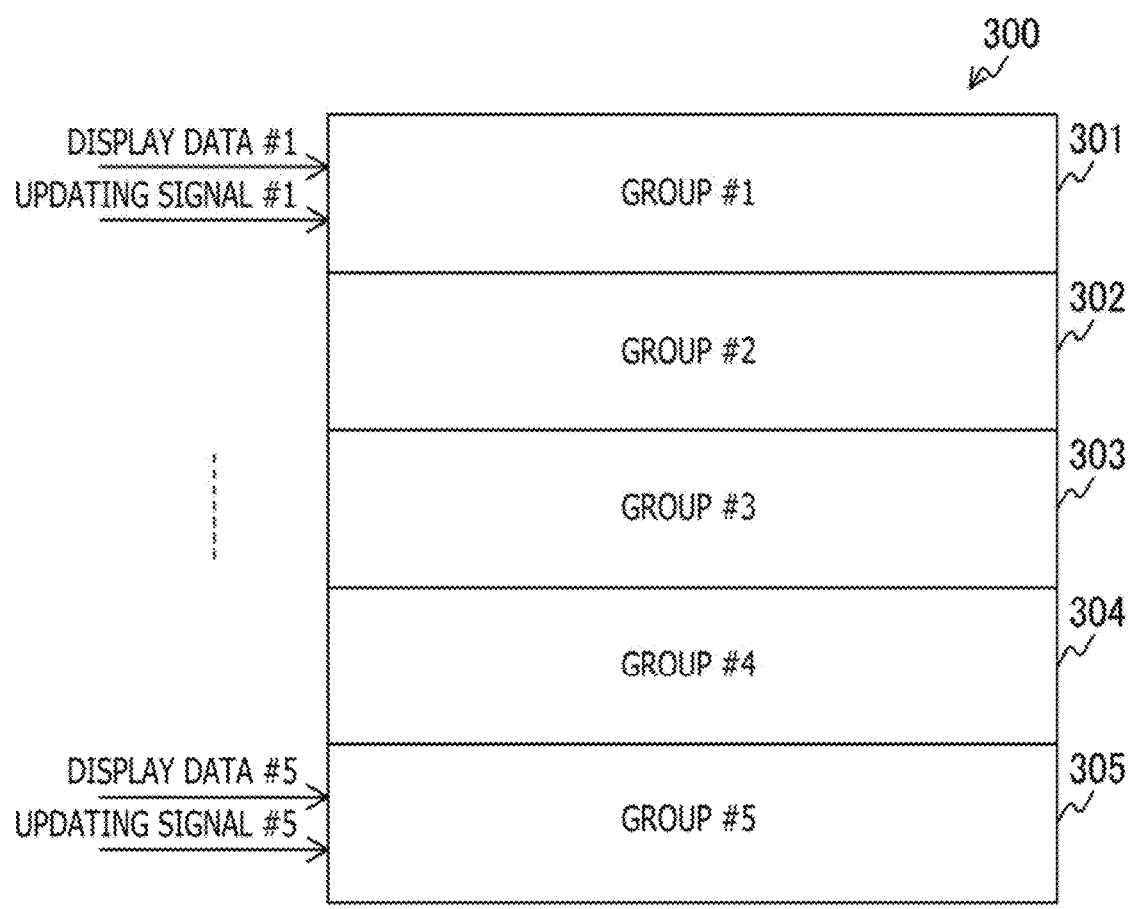
FIG. 4 is a diagram illustrating a configuration example of a display element array section 300 according to the embodiment of the present technology.

FIG. 4 is a diagram illustrating a configuration example of the display element array section 300 according to the embodiment of the present technology. The figure illustrates an arrangement of groups in the display element array section 300. The figure assumes a case in which the display elements 310 arranged in the display element array section 300 are divided into five groups (group #1 (301) to #5 (305)). In the group #1 (301) to #5 (305), for example, the display elements 310 arranged in a plurality of lines are included. The display data and the updating signal are input in each group. In the figure, a group of an input destination is identified on the basis of a figure attached to the display data and the updating signal. Concretely, the display data #1 and the updating signal #1 indicate the display data and the updating signal input in the group #1 (301). The updating signal #1 is mutually input in the supporting part 315 of the display element 310 arranged in the group #1 (301). By contrast, the display data #1 is held in the display data holding section of the display element array section 300. Then, the display data #1 is input in the memory 319 of the display element 310 in each line included in the group #1 (301).

Configuration of Control Section

Figure 5:
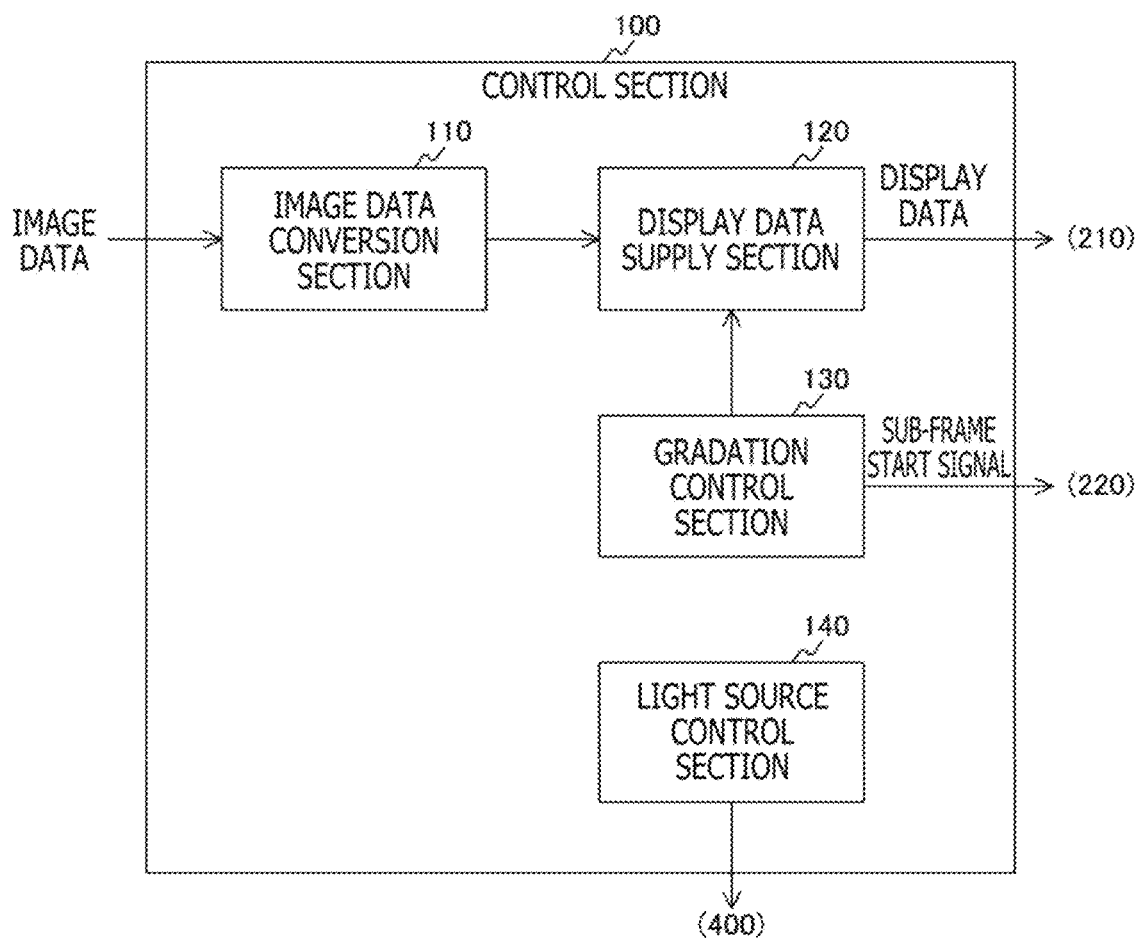
FIG. 5 is a diagram illustrating a configuration example of a control section 100 according to the embodiment of the present technology.

FIG. 5 is a diagram illustrating a configuration example of the control section 100 according to the embodiment of the present technology. The control section 100 includes an image data conversion section 110, the display data supply section 120, a gray-scale control section 130, and a light source control section 140.

The image data conversion section 110 converts image data input in the display apparatus 10 into display data. The image data conversion section 110 performs PWM on the image data and generates the display data in each sub-frame period to output the display data to the display data supply section 120.

The display data supply section 120 supplies the display data to the display element array section 300 in each sub-frame period and in each group. The display data supply section 120 holds the display data output from the image data conversion section 110 in the image memory in each sub-frame period. Then, the display data supply section 120 supplies the held display data in each sub-frame period by shifting a predetermined delay time in each group. For the predetermined delay time, there can be adopted the time required when the display data for one sub-frame period in one group is transferred to the display element array section 300. Through the process, the transfer of the display data can be performed to a plurality of groups in a distributed manner. Further, the predetermined delay time may be the same length as that of the sub-frame period in which the period is shortest among a plurality of the weighted sub-frame periods. Through the process, the display in each sub-frame period and the transfer of the display data can be synchronized with each other. In addition, control of the display of the sub-frame period and control of the transfer of the display data can be easily performed. Note that the display data is supplied to the display element array section 300 via the display control section 200.

Further, the supply of the display data in each sub-frame period is performed on the basis of an order of the sub-frame periods determined in accordance with the number of groups and the above-mentioned predetermined delay time. Details of the supply of the display data in the display data supply section 120 will be described below.

The gray-scale control section 130 performs control of the gray-scale display of the display element array section 300. The gray-scale control section 130 sets the order of the above-mentioned sub-frame periods. The above-mentioned display data supply section 120 performs the supply of the display data on the basis of the order of the sub-frame periods set by the gray-scale control section 130. Further, the gray-scale control section 130 generates a sub-frame start signal that is a signal for instructing a start of each sub-frame period and outputs the sub-frame start signal to the display control section 200.

The light source control section 140 controls the light source 500. The light source control section 140 performs control of lighting and extinction of each color of RGB, for example, in the light source 500.

Configuration of Display Control Section

Figure 6:
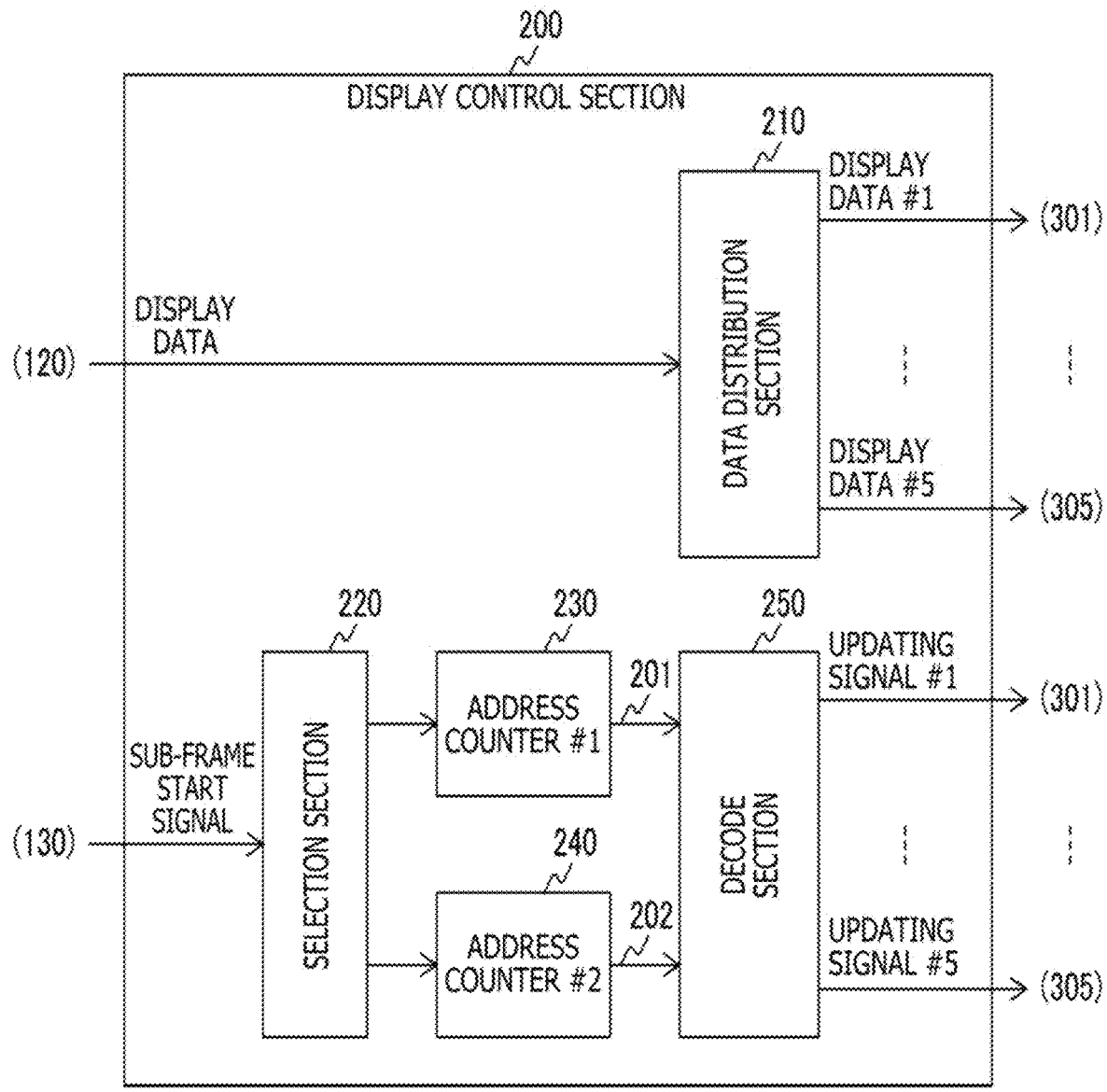
FIG. 6 is a diagram illustrating a configuration example of a display control section 200 according to the embodiment of the present technology.

FIG. 6 is a diagram illustrating a configuration example of the display control section 200 according to the embodiment of the present technology. The display control section 200 includes a data distribution section 210, a selection section 220, address counters #1 (230) and #2 (240), and a decode section 250.

The data distribution section 210 distributes the display data in each group supplied from the display data supply section 120 to the groups #1 (301) to #5 (305).

The selection section 220 alternately selects the address counters #1 (230) and #2 (240). The selection section 220 outputs the sub-frame start signal output from the gray-scale control section 130 to the selected address counter #1 (230) or #2 (240). The selection section 220 can select, for example, the address counter #1 (230) for a first sub-frame period of the frame period. Then, the selection section 220 can select the address counter #2 (240) for the next sub-frame period.

The address counters #1 (230) and #2 (240) generate an address for identifying a group that outputs an updating signal. The address counters #1 (230) and #2 (240) start the generation of the address on the basis of the sub-frame start signal. The generated address is output to the decode section 250. As the address counters #1 (230) and #2 (240), a shift register of the number of bits equal to the number of groups can be used. In the embodiment of the present technology, a shift register of 5 bits can be used.

The decode section 250 generates the updating signals #1 to #5 in each group from the addresses output from the address counters #1 (230) and #2 (240). The generated updating signals #1 to #5 are output to the groups #1 (301) to #5 (305), respectively. The output of the updating signals #1 to #5 permits the control of the display element 310 in the display control section 200 to be performed. Details of a configuration of the decode section 250 will be described below.

Configuration of Decode Section

Figure 7:
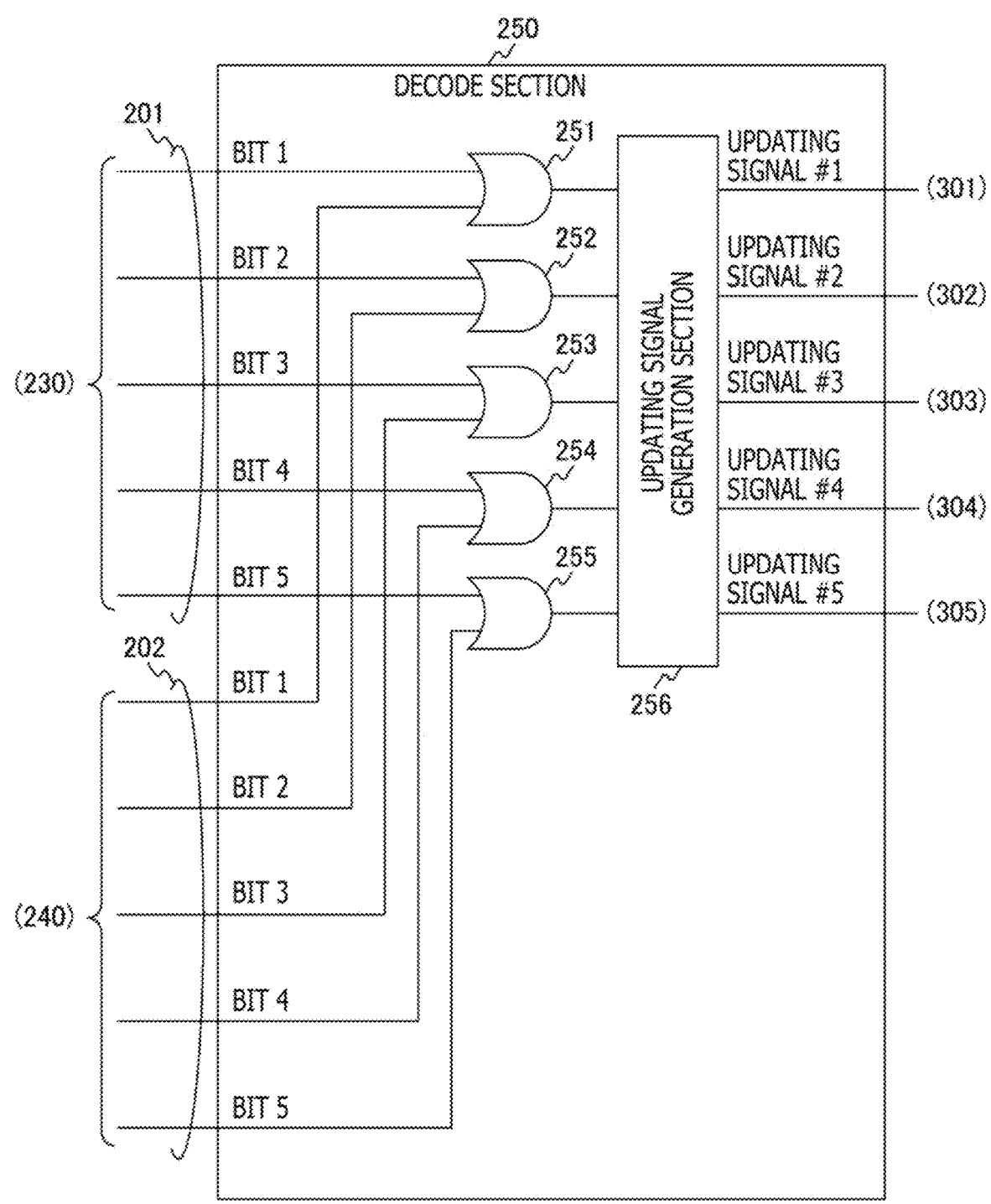
FIG. 7 is a diagram illustrating a configuration example of a decode section 250 according to the embodiment of the present technology.

FIG. 7 is a diagram illustrating a configuration example of the decode section 250 according to the embodiment of the present technology. The decode section 250 includes OR gates 251 to 255 and an updating signal generation section 256.

The OR gates 251 to 255 perform the logic operation of the addresses output from the address counters #1 (230) and #2 (240). There are arranged the OR gates 251 to 255 of the same number as the number of bits of the address counters #1 (230) and #2 (240). Further, the OR gates 251 to 255 perform the logic operation of the addresses output from the address counters #1 (230) and #2 (240) for each bit and generate a signal for instructing an update. Then, the OR gates 251 to 255 output the signal to the updating signal generation section 256.

The updating signal generation section 256 generates the updating signals #1 to #5 on the basis of the signal for instructing respective updates output from the OR gates 251 to 255 and outputs the updating signals #1 to #5 to the groups #1 (301) to #5 (305). The updating signal generation section 256 outputs the bias voltage illustrated in FIG. 2 at the stationary time. Then, the updating signal generation section 256 generates the updating signal by outputting an update voltage for a predetermined period when the signal for instructing the above-mentioned update is input.

Order of Sub-Frame Period

Figure 8:
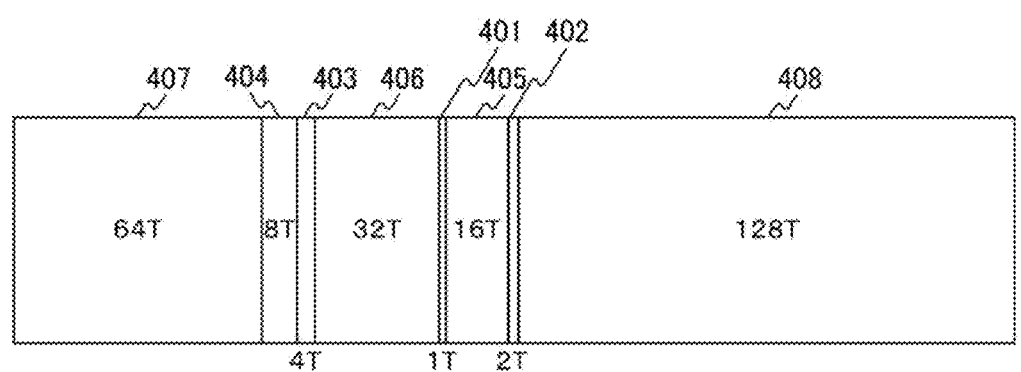
FIG. 8 is a diagram illustrating an example of an order of sub-frame periods according to a first embodiment of the present technology.

FIG. 8 is a diagram illustrating an example of the order of the sub-frame periods according to a first embodiment of the present technology. In the figure, there is assumed a case in which one frame period is divided into eight sub-frame periods 401 to 408 and a display of 256 gray-scales is performed. In the figure, a rectangle indicates the sub-frame period and characters attached to the rectangle indicate a length of the sub-frame period based on the sub-frame period 401 in which the period is shortest. Concretely, "64 T" attached to a sub-frame period 407 indicates that a length of the sub-frame period 407 is a sixty fourfold length of the sub-frame period 401. In the figure, in one frame period, the control of the display is performed in the order corresponding to the sub-frame periods 407, 404, 403, 406, 401, 405, 402, and 408. Details of the order of the sub-frame periods will be described below.

Display Control

Figure 9:
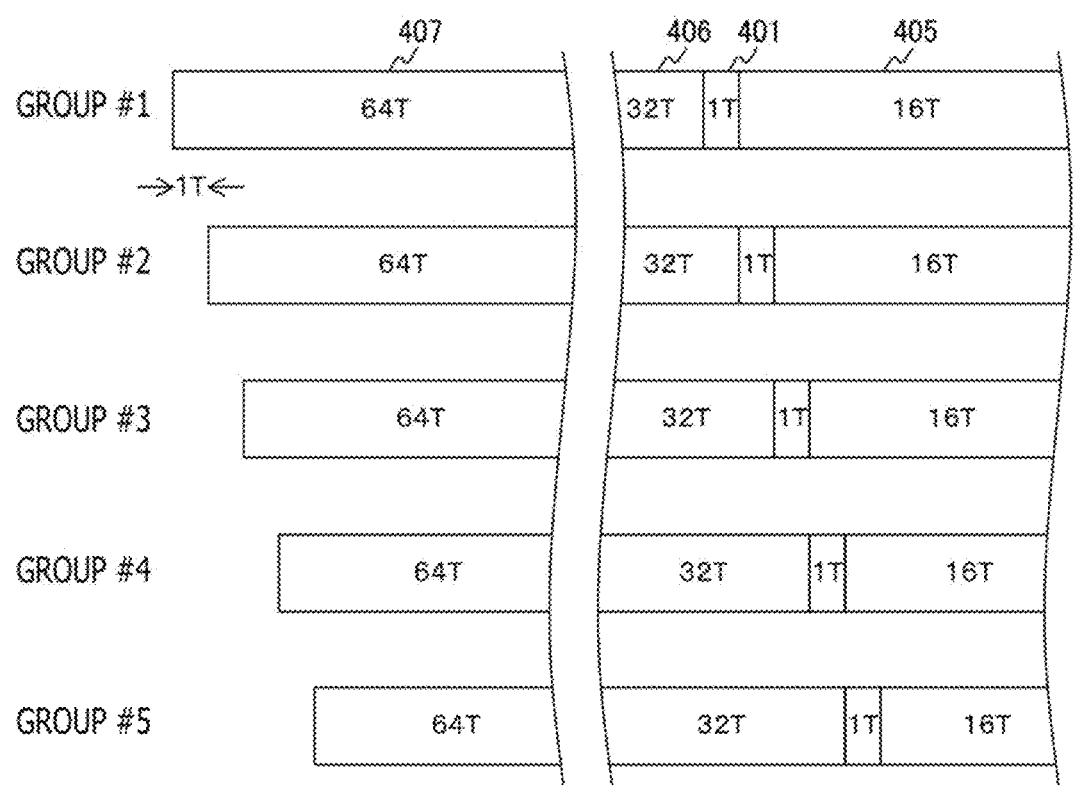
FIG. 9 is a diagram illustrating an example of display control according to the first embodiment of the present technology.

FIG. 9 is a diagram illustrating an example of the control of the display according to the first embodiment of the present technology. The figure illustrates an appearance in which the display is performed in each group on the basis of the order of the sub-frame periods illustrated in FIG. 8. As illustrated in the figure, the display of the sub-frame periods is performed by shifting the predetermined delay time in each group. In the figure, a period of 1 T is adopted as the predetermined delay time. Specifically, the delay time approximately the same as the shortest sub-frame period 401 is shifted and the control of the display is performed.

Transfer of Display Data

Figure 10A:
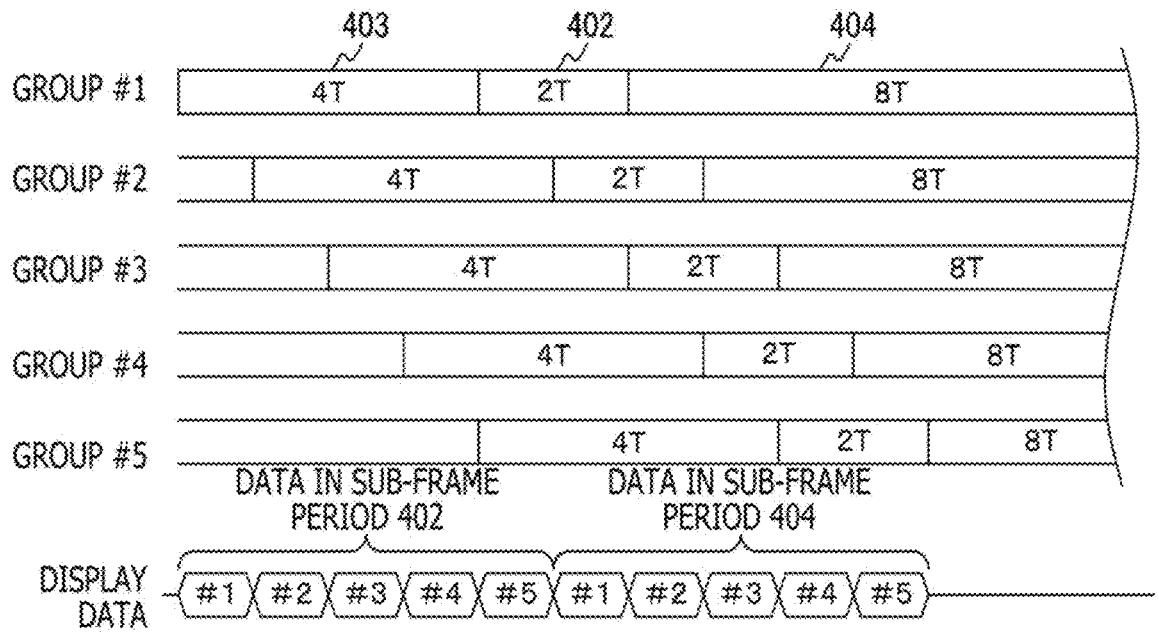
FIGS. 10A and 10B are diagrams illustrating an example of a transfer of display data according to the first embodiment of the present technology.
Figure 10B:
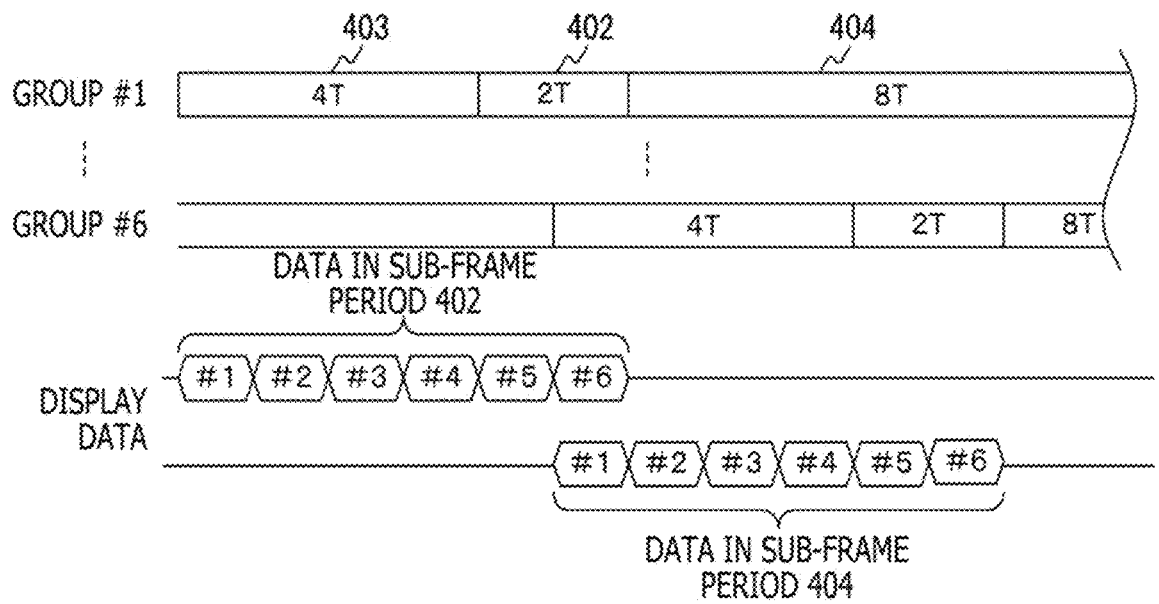

FIGS. 10A and 10B are diagrams illustrating an example of the transfer of the display data according to the first embodiment of the present technology. The figure illustrates a relationship between the transfer of the display data and the display of the display element 310 in each group. The groups #1 to #6 in the figure indicate the sub-frame periods in which the display is performed in the respective groups. In the figure, there is assumed a case in which the sub-frame periods 403, 402, and 404 illustrated in FIG. 8 are arranged in this order and the control of the display is performed. Further, the display data indicates display data that is supplied to the display element array section 300 from the display data supply section 120. The characters attached to the display data indicate an identification number of the relevant group. Concretely, "#1" indicates the display data of the group #1. Note that FIG. 10A indicates a case in which the display element array section 300 is divided into five groups as illustrated in FIG. 4. By contrast, FIG. 10B assumes a case in which the display element array section 300 is divided into six groups.

Before the display of the sub-frame period to which the display data corresponds is started, it is necessary to transfer the display data to the memory 319 of the display element 310. For example, the display data of the sub-frame period 402 of FIG. 10A is transferred to the display period of the sub-frame period 403 in each group. Similarly, the display data of the sub-frame period 404 is transferred to the display period of the sub-frame period 402 in each group. Since only the delay time corresponding to the period of 1T is shifted and the control of the display is performed in each group, even the display data can be transferred by shifting only the delay time. Note that it is assumed that data of the sub-frame period 403 is transferred before a start of the period.

The sub-frame periods are arranged in the order that a total of two adjacent sub-frame periods is longer, by a period corresponding to the delay time, than a total of periods at which the display data in each group is transferred. Concretely, in a case in which the sub-frame period and the display data transfer period are indicated as a unit of the delay time, a total period 6 T of the sub-frame periods 403 and 402 is longer, by 1 T, than a total 5 T of the periods at which the display data in each group is transferred. Therefore, a transfer of the display data of the subsequent sub-frame period 404 can be performed at the time of the sub-frame period 402. A relationship between the total of the adjacent sub-frame periods and the display data transfer period in each group described above is represented by using an expression. In the case, it is necessary to arrange the adjacent sub-frame periods in the order corresponding to the sub-frame periods satisfying the following relational expression.

$$T \times (G+1) \leq SF \quad \text{(Expression 1)}$$

Here, T represents a delay time. Further, G represents the number of groups. Further, SF represents a total of two adjacent sub-frame periods.

By contrast, in FIG. 10B, the expression 1 is not satisfied because the number of groups is six. A transfer period of the display data in the group #6 of the sub-frame period 402 is overlapped with a transfer period of the display data in the group #1 of the sub-frame period 404. In this case, the display data #1 of the sub-frame period 404 is transferred, and therefore there arises the necessity of delaying a start of the sub-frame period 404 by 1T.

Another Example of Transfer of Display Data

Figure 11:
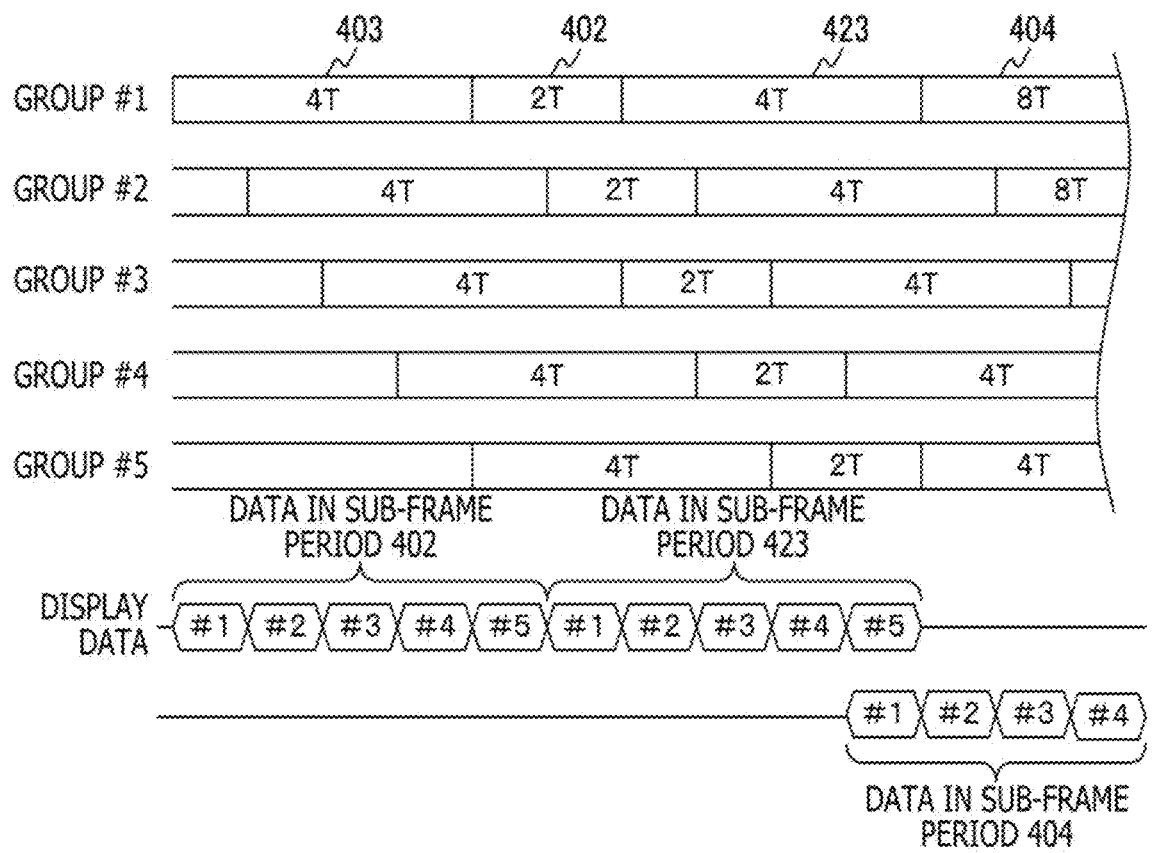
FIG. 11 is a diagram illustrating another example of the transfer of the display data according to the first embodiment of the present technology.

FIG. 11 is a diagram illustrating another example of the transfer of the display data according to the first embodiment of the present technology. The figure illustrates an example in a case in which a sub-frame period 423 is arranged between the sub-frame periods 402 and 404 in FIG. 10A. For example, the sub-frame period 423 is a sub-frame period generated by dividing a sub-frame period 408. The division of the sub-frame period will be described below. In the figure, the adjacent sub-frame periods 403 and 402 and sub-frame periods 402 and 423 respectively satisfy the expression 1. However, a transfer period of the display data #5 of the sub-frame period 423 is overlapped with that of the display data #1 of the sub-frame period 404. The reason is that in the display period of the group #1, the transfer periods of the display data of the sub-frame periods 402 and 423 are allocated to the sub-frame period 402 arranged in the center of the three sub-frame periods. In the result, a start of the transfer of the display data of the sub-frame period 423 is delayed and overlapping of the transfer period is caused. Specifically, in three adjacent sub-frame periods, a transfer of the display data of a second sub-frame period (the sub-frame period 402) exerts an influence on a transfer of the display data of a last sub-frame period (the sub-frame period 423).

To solve the problem, in the three adjacent sub-frame periods, the sub-frame periods are arranged in the order satisfying the following relational expression. The process permits the display data transfer periods to be prevented from being overlapped.

$$T \times (2 \times G + 1) \leq SF \quad \text{(Expression 2)}$$

As described above, the sub-frame periods are arranged in the order satisfying the expressions 1 and 2, and thereby the transfer periods of the display data can be prevented from being overlapped. The sub-frame periods illustrated in FIG. 8 are arranged in the order satisfying the expressions 1 and 2.

Transfer of Display Data

Figure 12:
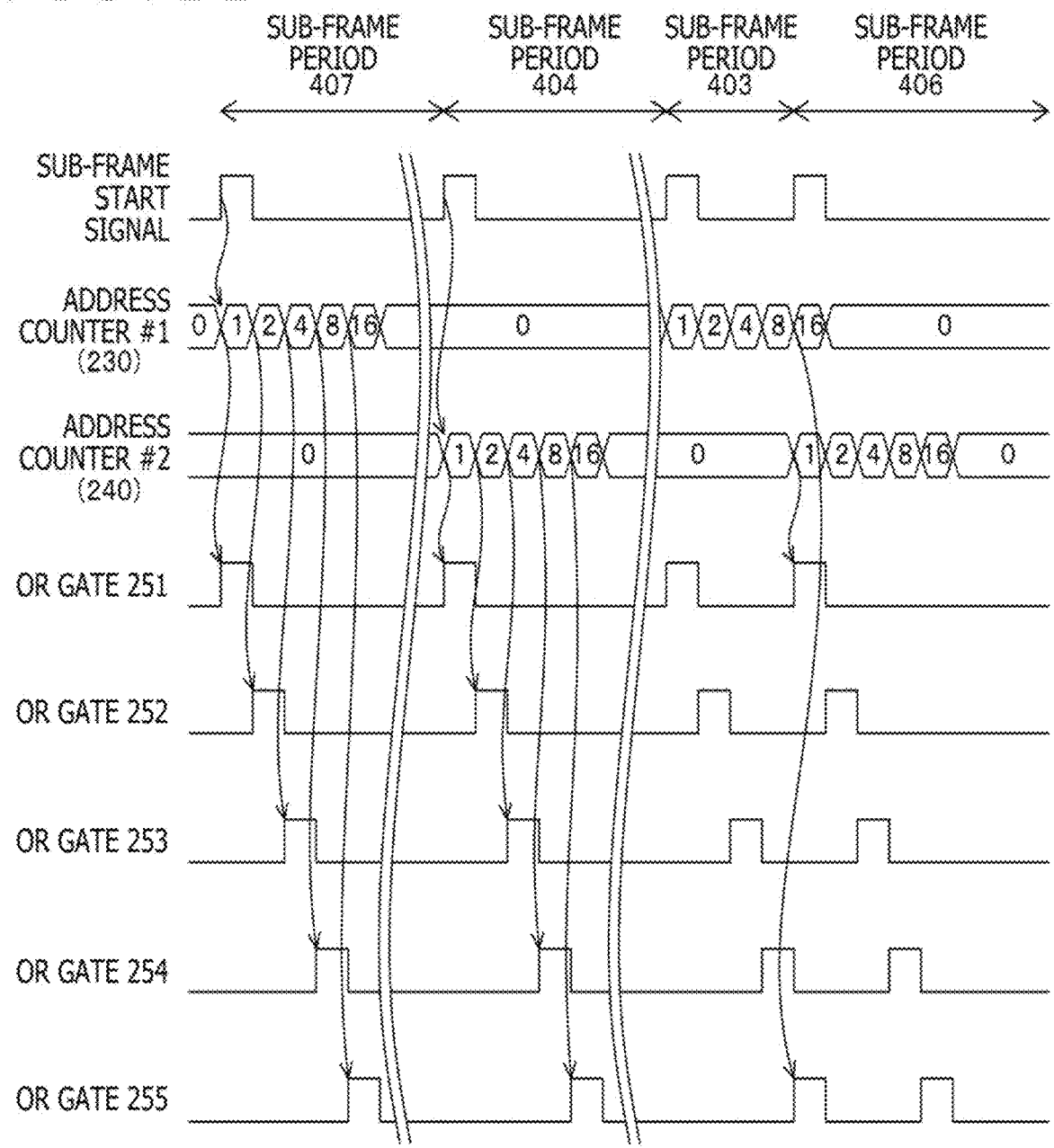
FIG. 12 is a diagram illustrating an example of a generation of a signal for instructing an update according to the embodiment of the present technology.

FIG. 12 is a diagram illustrating an example of a generation of a signal for instructing the update according to the embodiment of the present technology. The figure illustrates an appearance of the generation of the signal for instructing the update illustrated in FIG. 7. Further, there is assumed a case in which the sub-frame periods illustrated in the figure are arranged in the order corresponding to the sub-frame periods illustrated in FIG. 8. In the figure, the sub-frame start signal indicates a sub-frame start signal output from the gray-scale control section 130. Further, the address counter #1 (230) and the address counter #2 (240) indicate respective outputs from the address counter #1 (230) and the address counter #2 (240). The OR gates 251 to 255 indicate respective outputs from the OR gates 251 to 255 of the decode section 250.

First, in the sub-frame period 407, the sub-frame start signal becomes a value "1." The selection section 220 selects the address counter #1 (230) and outputs the sub-frame start signal to the address counter #1 (230). Through the process, an output of the address counter #1 (230) transits to a value "1" from a value "0." Then, the address counter #1 (230) is shifted by a clock signal synchronized with the above-mentioned delay time (1 T) and the output of the address counter #1 (230) transits to values "2," "4," "8," "16," and "0" in sequence. Outputs of the OR gates 251 to 255 connected to a bit that is the value "1" among the outputs of the address counter #1 (230) become a period value "1" of 1 T. The outputs of the OR gates 251 to 255 are input, as the signal for instructing the update, to the updating signal generation section 256 of the decode section 250. Then, the updating signal is generated by the updating signal generation section 256 and is output to the display element array section 300.

In the following sub-frame period 404, the selection section 220 selects the address counter #2 (240) and outputs the sub-frame start signal to the address counter #2 (240). Outputs of the address counter #2 (240) transit to "1," "2," "4," "8," and "16" in sequence. The outputs of the OR gates 251 to 255 become a value "1" in accordance with the above outputs and the signal for instructing the update is generated.

Note that the group #5 of the sub-frame period 403 is overlapped with the group #1 of the sub-frame period 406 in the display start timing. Even in the case, the counting of the address is performed by using the two address counters #1 (230) and #2 (240). In addition, the logic operation of the outputs of the address counters is performed by using the OR gate 251 and the like. The process permits a signal for instructing two updates to be generated.

Setting of Order of Sub-Frame Periods

Figure 13:
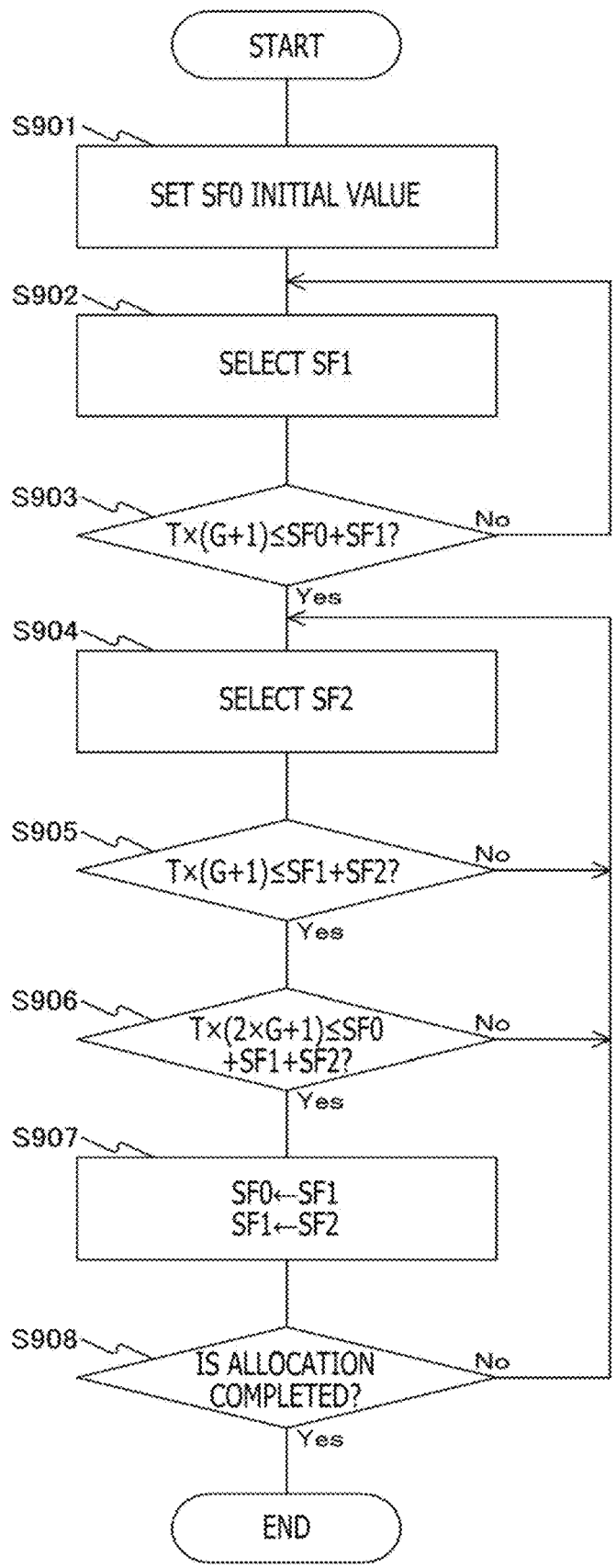
FIG. 13 is a diagram illustrating an example of a processing procedure for setting processing of the order of the sub-frame periods according to the embodiment of the present technology.

FIG. 13 is a diagram illustrating an example of a processing procedure of setting processing of the order of the sub-frame periods according to the embodiment of the present technology. The figure illustrates processing performed by the gray-scale control section 130 illustrated in FIG. 5. In the figure, SF0, SF1, and SF2 are variables for storing lengths of the adjacent sub-frame periods. Further, sub-frame periods to set an order are stored in an array, etc., and the processing is started.

First, the gray-scale control section 130 sets an initial value of the SF0 (step S901). For example, one sub-frame period is appropriately selected from the sub-frame periods 401 to 408 illustrated in FIG. 8 and the selected sub-frame period is stored in the SF0 to thereby perform the setting of the initial value. Subsequently, the gray-scale control section 130 selects the SF1 (step S902). In the case, the gray-scale control section 130 selects a sub-frame period excluding the sub-frame period selected in step S901 from among the sub-frame periods 401 to 408 and stores the sub-frame period in the SF1 to thereby perform the setting of the initial value. Then, the gray-scale control section 130 determines whether or not a total of the SF0 and the SF1 is greater than or equal to $T \times (G+1)$ (step S903). In a case where the total of the SF0 and the SF1 is smaller than $T \times (G+1)$ (step S903: No), the gray-scale control section 130 selects the SF1 again (step S902).

In a case where the total of the SF0 and the SF1 is greater than or equal to $T \times (G+1)$ (step S903: Yes), the gray-scale control section 130 selects the SF2 (step S904). The gray-scale control section 130 selects a sub-frame period excluding the sub-frame period selected as the SF0 and the SF1 to thereby select the SF2. Then, the gray-scale control section 130 determines whether or not a total of the SF1 and the SF2 is greater than or equal to $T \times (G+1)$ (step S905). In a case where the total of the SF1 and the SF2 is smaller than $T \times (G+1)$ (step S905: No), the gray-scale control section 130 selects the SF2 again (step S904). In a case where the total of the SF1 and the SF2 is greater than or equal to $T \times (G+1)$ (step S905: Yes), the gray-scale control section 130 determines whether or not a total of the SF0, the SF1, and the SF2 is greater than or equal to $T \times (2 \times G+1)$ (step S906). In a case where the total of the SF0, the SF1, and the SF2 is smaller than $T \times (2 \times G+1)$ (step S906: No), the gray-scale control section 130 selects the SF2 again (step S904).

In a case where the total of the SF0, the SF1, and the SF2 is greater than or equal to $T \times (2 \times G+1)$ (step S906: Yes), the gray-scale control section 130 stores the sub-frame periods stored in the SF1 and the SF2 in the SF0 and the SF1, respectively (step S907). On this occasion, the gray-scale control section 130 sets the sub-frame periods stored in the SF0, the SF1, and the SF2 to a sub-frame period in which an allocation of the order is completed and deletes the sub-frame periods from the above-mentioned array. Next, the gray-scale control section 130 determines whether or not the allocation of the order of all the sub-frame periods is completed (step S908). In a case where the allocation of the order of all the sub-frame periods is not completed (step S908: No), the gray-scale control section 130 performs again the processes from step S904 to step S908 on the sub-frame periods in which the allocation is not completed as the object. On the other hand, in a case where the allocation of the order of all the sub-frame periods is completed (step S908: Yes), the gray-scale control section 130 completes the setting processing of the order of the sub-frame periods.

As described above, the order of the sub-frame periods is set on the basis of the predetermined delay time and the number of groups. Further, the transfer of the display data is performed in each group on the basis of the order of the sub-frame periods. The process permits the transfer of the display data to be easily performed.

As described above, according to the first embodiment of the present technology, the order of the sub-frame periods can be determined on the basis of the predetermined delay time and the number of groups. In addition, the setting of the order of the sub-frame periods can be simplified.

2. Second Embodiment

In the above-mentioned first embodiment, the control of the display is performed in each sub-frame period. In response, there arises a problem that a pseudo contour is generated in an image in a relatively long sub-frame period. To solve the problem, in a second embodiment, it is assumed that the sub-frame period is further divided and the control of the display is performed. Therefore, a second embodiment of the present technology differs from the first embodiment in that the transfer of the display data in each of the divided sub-frame periods is further performed.

Order of Sub-Frame Periods

Figure 14:
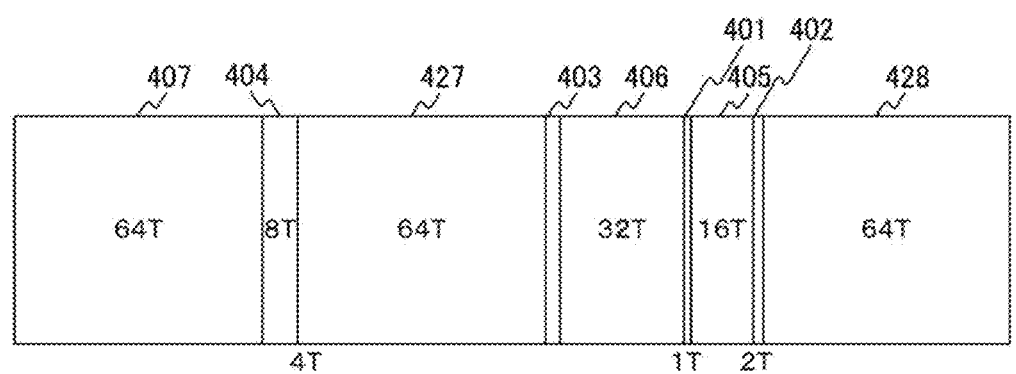
FIG. 14 is a diagram illustrating an example of an order of sub-frame periods according to a second embodiment of the present technology.

FIG. 14 is a diagram illustrating an example of an order of sub-frame periods according to the second embodiment of the present technology. The figure differs from the order of the sub-frame periods illustrated in FIG. 8 in that the sub-frame period 408 is divided into sub-frame periods 427 and 428, and at the same time, the sub-frame period 427 is arranged between the sub-frame periods 404 and 403. Either of the sub-frame periods 427 and 428 has a length of 64 T. As described above, a relatively long sub-frame period is divided into a plurality of short sub-frame periods and the divided sub-frame periods are arranged in a distributed manner. The process permits the pseudo contour to be prevented from being generated.

Here, the pseudo contour is a phenomenon in which in a case in which an image with a medium luminance level moves on a screen, a human eye follows a movement of the sub-frame period in a state of non-display and thereby in which a pixel whose luminance level is zero appears to move. The pseudo contour is a phenomenon that arises in the display apparatus that performs the gray-scale display through PWM and leads to reduction in the image quality. The sub-frame period 408 illustrated in FIG. 8 has approximately the same length as that of a total period of the remaining all sub-frame periods. Therefore, in an image in a state in which the display is not performed in the sub-frame period 408 and the display is performed in the total period of the remaining all sub-frame periods, the pseudo contour is easily generated. To solve the problem, the sub-frame period 408 is divided into the sub-frame periods 427 and 428, and the sub-frame periods 427 and 428 are arranged in one frame period in a distributed manner. On this occasion, all the sub-frame periods including the divided sub-frame periods 427 and 428 are set in the order satisfying the above-mentioned expressions (1) and (2).

Note that the division of the sub-frame period is not limited to the example. For example, the sub-frame period 408 can be divided into three or more sub-frame periods. Further, the sub-frame period 407 can be divided in addition to the sub-frame period 408.

A configuration of the display apparatus 10 other than the above is similar to that of the display apparatus 10 according to the first embodiment of the present technology and therefore descriptions are omitted.

As described above, according to the second embodiment of the present technology, the sub-frame period is divided, and at the same time, arranged in a distributed manner. Through the process, the pseudo contour can be prevented from being generated and the image quality can be improved.

Note that the above-mentioned embodiments provide examples for embodying the present technology and the matters in the embodiments and the invention-specifying matters in the scope of claims are associated. Similarly, the invention-specifying matters in the scope of claims and the matters in the embodiments of the present technology, which are denoted by the identical names, have correspondence. It should be noted that the present technology is not limited to the embodiments and can be embodied by making various modifications to the embodiments without departing from its essence.

Further, the processing procedures described in the above embodiments may be construed as methods including those series of procedures or a program for causing a computer to execute those series of procedures or may be construed as a recording medium storing that program. As this recording medium, a CD (Compact Disc), an MD (Mini Disc), a DVD (Digital Versatile Disc), a memory card, and a Blu-ray disc (Blu-ray (registered trademark) Disc) can be used, for example.

Note that the effects described in the present specification are mere examples and should not be limited, and effects other than those described in the present specification may also be obtained.

Note that the present technology can also take the following configurations.

(1) A display apparatus including:

a display element array section including a plurality of arranged display elements in which a gray-scale display is performed in accordance with display data in each frame period that is a display period of one screen;

a display control section configured to divide the frame period into a plurality of sub-frame periods and divide the plurality of display elements into a plurality of groups to perform control of a display in each of the plurality of sub-frame periods in each of the plurality of groups; and a display data supply section configured to supply the display data in each of the sub-frame periods to the display element array section by shifting a predetermined delay time in each of the groups and supply the display data in each of the sub-frame periods to the display element array section on a basis of an order of the sub-frame periods in accordance with the number of the divided groups and the predetermined delay time.

(2) The display apparatus according to (1), in which the display data supply section supplies the display data to the display element array section on a basis of the order of the sub-frame periods in which a total of the plurality of adjacent sub-frame periods is longer, by the delay time or more, than a product of the number of the sub-frame periods excluding a first one of the plurality of adjacent sub-frame periods, the number of groups, and the delay time in the plurality of adjacent sub-frame periods.

(3) The display apparatus according to (2), in which the display data supply section supplies the display data to the display element array section on a basis of the order of the sub-frame periods in which a total of two adjacent sub-frame periods satisfies a conditional expression (a) below, and a total of three adjacent sub-frame periods satisfies a conditional expression (b) below.

$T \times (G+1) \leq SF$  Conditional expression (a):

$T \times (2 \times G+1) \leq SF$  Conditional expression (b):

in which,
SF: total of adjacent sub-frame periods
T: predetermined delay time
G: number of divided groups (4) The display apparatus according to any one of (1) to (3), in which
the display data supply section supplies the display data to the display element array section by using, as the predetermined delay time, approximately the same period as a sub-frame period in which a period is shortest among the sub-frame periods.

(5) The display apparatus according to any one of (1) to (4), in which
the display control section performs control of a display in each of the groups by shifting the predetermined delay time.

(6) The display apparatus according to any one of (1) to (5), in which
the display control section outputs an updating signal for reflecting the supplied display data on the display of the plurality of display elements and thereby performs the control of the display.

(7) The display apparatus according to any one of (1) to (6), in which
the display control section further divides at least one of the plurality of sub-frame periods into a plurality of new sub-frame periods and distributes the plurality of new sub-frame periods to the frame period to perform the control of the display, and
the display data supply section further supplies the display data in each of the plurality of new sub-frame periods to the display element array section.

REFERENCE SIGNS LIST

10 Display apparatus
100 Control section
110 Image data conversion section
120 Display data supply section
130 Gray-scale control section
140 Light source control section
200 Display control section
210 Data distribution section
220 Selection section
230, 240 Address counter
250 Decode section
251 to 255 OR gate
256 Updating signal generation section
300 Display element array section
301 to 305 Group
310 Display element
311 Mirror
313, 314 Electrode
315 Supporting part
319 Memory
401 to 408, 423, 427, 428, 491 to 494 Sub-frame period
500 Light source

The invention claimed is:

1. A display apparatus, comprising:
a display element array section including a plurality of display elements, wherein
the plurality of display elements is configured to execute a gray-scale display based on display data in a frame period, and
the frame period is a display period of one screen;
a display control section configured to:
divide the frame period into a first plurality of sub-frame periods;
divide the plurality of display elements into a plurality of groups; and
control display in each sub-frame period of the first plurality of sub-frame periods in each group of the plurality of groups; and
a display data supply section configured to supply the display data in each sub-frame period of the first plurality of sub-frame periods to the display element array section by shift of a delay time for each group of the plurality of groups, wherein
the supply of the display data in each sub-frame period of the first plurality of sub-frame periods to the display element array section is based on an order of the first plurality of sub-frame periods,
the order of the first plurality of sub-frame periods is based on a number of the plurality of groups,
a total of a plurality of adjacent sub-frame periods of the first plurality of sub-frame periods is longer than a product of:
a number of the first plurality of sub-frame periods that excludes a first adjacent sub-frame period of the plurality of adjacent sub-frame periods,
the number of the plurality of groups, and
the delay time, and
the total of the plurality of adjacent sub-frame periods is longer than the product by one of the delay time or a specific time greater than the delay time.

2. The display apparatus according to claim 1, wherein
a total of two adjacent sub-frame periods of the plurality of adjacent sub-frame periods satisfies a first expression:
$T \times (G+1) \leq SF$, and
a total of three adjacent sub-frame periods of the plurality of adjacent sub-frame periods satisfies a second expression:
$T \times (2 \times G+1) \leq SF$,
SF is a corresponding total of the adjacent sub-frame periods,
T is the delay time, and
G is the number of the plurality of groups.

3. The display apparatus according to claim 1, wherein
the delay time is substantially the same as a specific sub-frame period of the first plurality of sub-frame periods, and
the specific sub-frame period is shortest among the first plurality of sub-frame periods.

4. The display apparatus according to claim 1, wherein the display control section is further configured to:
output an updating signal; and
control, based on the updating signal, the plurality of display elements to display the supplied display data.

5. The display apparatus according to claim 1, wherein the display control section is further configured to:
divide at least one sub-frame period of the first plurality of sub-frame periods into a second plurality of sub-frame periods;
distribute the second plurality of sub-frame periods to the frame period; and
control the display in each sub-frame period of the first plurality of sub-frame periods based on the distribution of the second plurality of sub-frame periods, and the display data supply section is further configured to supply the display data in each sub-frame period of the second plurality of sub-frame periods to the display element array section.

\* \* \* \* \*